(12) United States Patent
Ueyoko et al.

(10) Patent No.: US 7,789,120 B2
(45) Date of Patent: *Sep. 7, 2010

(54) TIRE HAVING A COMPOSITE BELT STRUCTURE

(75) Inventors: Kiyoshi Ueyoko, Fairlawn, OH (US); John Joseph Slivka, Danville, VA (US); Roel Domingo Villaneuva, Hudson, OH (US); Robert John Boehlefeld, Brecksville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 794 days.

This patent is subject to a terminal disclaimer.

(21) Appl. No.: 11/103,110

(22) Filed: Apr. 11, 2005

(65) Prior Publication Data

US 2006/0000536 A1    Jan. 5, 2006

Related U.S. Application Data

(62) Division of application No. 10/373,384, filed on Feb. 24, 2003, now abandoned.

(51) Int. Cl.
*B60C 9/22*    (2006.01)

(52) U.S. Cl. ................................. 152/531; 152/533

(58) Field of Classification Search .............. 152/531, 152/533
See application file for complete search history.

(56) References Cited

U.S. PATENT DOCUMENTS

| | | | |
|---|---|---|---|
| 3,608,605 A | 9/1971 | Cole | |
| 4,838,966 A | 6/1989 | Oswald | |
| 5,176,769 A * | 1/1993 | Kadota et al. ........... | 152/531 X |
| 5,205,881 A | 4/1993 | Kohno et al. | |
| 5,223,061 A | 6/1993 | Navaux | |
| 5,271,445 A | 12/1993 | Kohno et al. | |
| 5,385,190 A | 1/1995 | Assaad et al. | |
| 5,427,167 A | 6/1995 | Watanabe et al. | |
| 5,513,685 A | 5/1996 | Watanabe et al. | |
| 5,535,801 A | 7/1996 | Iseki et al. | |
| 5,593,523 A | 1/1997 | Suzuki et al. | |
| 5,683,543 A | 11/1997 | Morikawa et al. | |
| 5,730,814 A | 3/1998 | Morikawa et al. | |
| 6,058,997 A | 5/2000 | Nishida et al. | |
| 6,098,683 A | 8/2000 | Nakano | |

(Continued)

FOREIGN PATENT DOCUMENTS

EP    0425318    5/1991

(Continued)

*Primary Examiner*—Adrienne C Johnstone
(74) *Attorney, Agent, or Firm*—June E. Rickey

(57) ABSTRACT

A pneumatic tire having a carcass and a belt reinforcing structure wherein the belt reinforcing structure is a composite belt structure having at least one pair of radially outer zigzag layers and at least one spirally wound belt layer with cords inclined at an inclination of 5 degrees or less relative to the tire's centerplane and located radially inward of and adjacent to the at least two radially outer belt layers. The at least two radially outer zigzag belt layers have cords inclined at 5 degrees to 30 degrees relative to the tire's centerplane and extending in alternation to turnaround points at each lateral edge of the belt layer. At each turnaround point the cords are folded or preferably bent to change direction across the crown of the carcass thus forming a zigzag cord path.

1 Claim, 7 Drawing Sheets

U.S. PATENT DOCUMENTS

| | | | |
|---|---|---|---|
| 6,116,311 | A | 9/2000 | Ueyoko et al. |
| 6,125,900 | A | 10/2000 | De Loze de Plaisance et al. |
| 6,374,890 | B1 | 4/2002 | Nakano |
| 6,520,232 | B1 | 2/2003 | Miyazaki et al. |
| 6,708,747 | B1 * | 3/2004 | Tsuruta et al. .......... 152/531 X |
| 7,360,571 | B2 * | 4/2008 | Ueyoko et al. .............. 152/531 |
| 2005/0194081 | A1 * | 9/2005 | Yano et al. |

FOREIGN PATENT DOCUMENTS

| | | |
|---|---|---|
| EP | 501 782 A2 * | 9/1992 |
| EP | 00887208 | 12/1998 |
| JP | 5-270211 | 10/1993 |
| JP | 8-156513 A2 | 6/1996 |
| JP | 9-226313 | 1/1998 |
| JP | 2002211208 A * | 7/2002 |
| WO | WO-03/061991 A1 * | 7/2003 |

* cited by examiner

TIRE HAVING A COMPOSITE BELT STRUCTURE

This application is a Divisional of U.S. patent application Ser. No. 10/373,384, filed Feb. 24, 2003 now abandoned.

FIELD OF THE INVENTION

This invention relates to pneumatic tires having a carcass and a belt reinforcing structure, more particularly to high speed heavy load radial ply tires such as those used on aircraft.

BACKGROUND OF THE INVENTION

Pneumatic tires for high speed applications experience a high degree of flexure in the crown area of the tire as the tire enters and leaves the contact patch. This problem is particularly exacerbated on aircraft tires wherein the tires can reach speed of over 200 mph at takeoff and landing.

When a tire spins at very high speeds the crown area tends to grow in dimension due to the high angular accelerations and velocity tending to pull the tread area radially outwardly. Counteracting these forces is the load of the vehicle which is only supported in the small area of the tire known as the contact patch.

In U.S. Pat. No. 5,427,167, Jun Watanabe of Bridgestone Corporation suggested that the use of a large number of belt plies piled on top of one another was prone to cracks inside the belt layers which tended to grow outwardly causing a cut peel off and scattering of the belt and the tread during running. Therefore, such a belt ply is not used for airplanes. Watanabe found that zigzag belt layers could be piled onto the radially inner belt layers if the cord angles progressively increased from the inner belt layers toward the outer belt layers. In other words the radially inner belt plies contained cords extending substantially in a zigzag path at a cord angle A of 5 degrees to 15 degrees in the circumferential direction with respect to the equatorial plane while being bent at both sides or lateral edges of the ply. Each of the outer belt plies contains cords having a cord angle B larger than the cord angle A of the radially inner belt plies.

In one embodiment each of the side end portions between adjoining two inner belt plies is provided with a further extra laminated portion of the strip continuously extending in the circumferential direction and if the radially inner belt plies have four or more in number then these extra laminated portions are piled one upon another in the radial direction. The inventor Watanabe noted the circumferential rigidity in the vicinity of the side end of each ply or the tread end can be locally increased so that the radial growth in the vicinity of the tread end portion during running at high speed can be reduced.

SUMMARY OF THE INVENTION

A pneumatic tire having a carcass and a belt reinforcing structure wherein the belt reinforcing structure is a composite belt structure having at least one pair of radially outer zigzag layers and at least one spirally wound belt layer with cords inclined at an inclination of 5 degrees or less relative to the tire's centerplane and located radially inward of and adjacent to the at least two radially outer zigzag belt layers.

The at least two radially outer zigzag belt layers have cords inclined at 5 degrees to 30 degrees relative to the tire's centerplane and extending in alternation to turnaround points at each lateral edge of the belt layer. At each turnaround point the cords are folded or preferably bent to change direction across the crown of the carcass thus forming a zigzag cord path.

In a preferred embodiment at least two radially inner zigzag belt layers are positioned between the carcass and the at least one spirally wound belt layer. Each of the radially inner zigzag belt layers has cords wound at an inclination of 5 degrees to 30 degrees relative to the centerplane of the tire and extending in alternation to turnaround points at each lateral edge of the belt layers.

The cords of the at least two radially inner spirally wound belt layers are wound from a single cord or from a group of 2 to 20 cords which continuously extend to form spirally wound belt layer and the at least two radially outer belt layers.

Alternatively, the cords of the spirally wound belt layer in a single cord or a group of 2 to 20 cords may be continuously wound to form the at least two radially outer belt layers.

As described above the tire should have three belt layers, preferably five, as a minimum as measured at the tire's center.

The tire is well suited for high speeds and large loads such as found in aircraft tires.

DEFINITIONS

"Apex" means a non-reinforced elastomer positioned radially above a bead core.

"Aspect ratio" of the tire means the ratio of its section height (SH) to its section width (SW) multiplied by 100% for expression as a percentage.

"Axial" and "axially" mean lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Cut belt or cut breaker reinforcing structure" means at least two cut layers of plies of parallel cords, woven or unwoven, underlying the tread, unanchored to the bead, and having both left and right cord angles in the range from 10 degrees to 33 degrees with respect to the equatorial plane of the tire.

"Bias ply tire" means a tire having a carcass with reinforcing cords in the carcass ply extending diagonally across the tire from bead core to bead core at about a 25°-50° angle with respect to the equatorial plane of the tire. Cords run at opposite angles in alternate layers.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Chafers" refer to narrow strips of material placed around the outside of the bead to protect cord plies from the rim, distribute flexing above the rim, and to seal the tire.

"Chippers" mean a reinforcement structure located in the bead portion of the tire.

"Cord" means one of the reinforcement strands of which the plies in the tire are comprised.

"Equatorial plane (EP)" means the plane perpendicular to the tire's axis of rotation and passing through the center of its tread.

"Flipper" means a reinforced fabric wrapped about the bead core and apex.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Net-to-gross ratio" means the ratio of the tire tread rubber that makes contact with the road surface while in the footprint, divided by the area of the tread in the footprint, including non-contacting portions such as grooves.

"Nominal rim diameter" means the average diameter of the rim flange at the location where the bead portion of the tire seats.

"Normal inflation pressure" refers to the specific design inflation pressure and load assigned by the appropriate standards organization for the service condition for the tire.

"Normal load" refers to the specific design inflation pressure and load assigned by the appropriate standards organization for the service condition for the tire.

"Ply" means a continuous layer of rubber-coated parallel cords.

"Radial" and "radially" mean directions radially toward or away from the axis of rotation of the tire.

"Radial-ply tire" means a belted or circumferentially-restricted pneumatic tire in which the ply cords which extend from bead to bead are laid at cord angles between 65° and 90° with respect to the equatorial plane of the tire.

"Section height" (SH) means the radial distance from the nominal rim diameter to the outer diameter of the tire at its equatorial plane.

"Zigzag belt reinforcing structure" means at least two layers of cords or a ribbon of parallel cords having 2 to 20 cords in each ribbon and laid up in an alternating pattern extending at an angle between 5° and 30° between lateral edges of the belt layers.

DETAILED DESCRIPTION OF THE INVENTION

Figure 1:
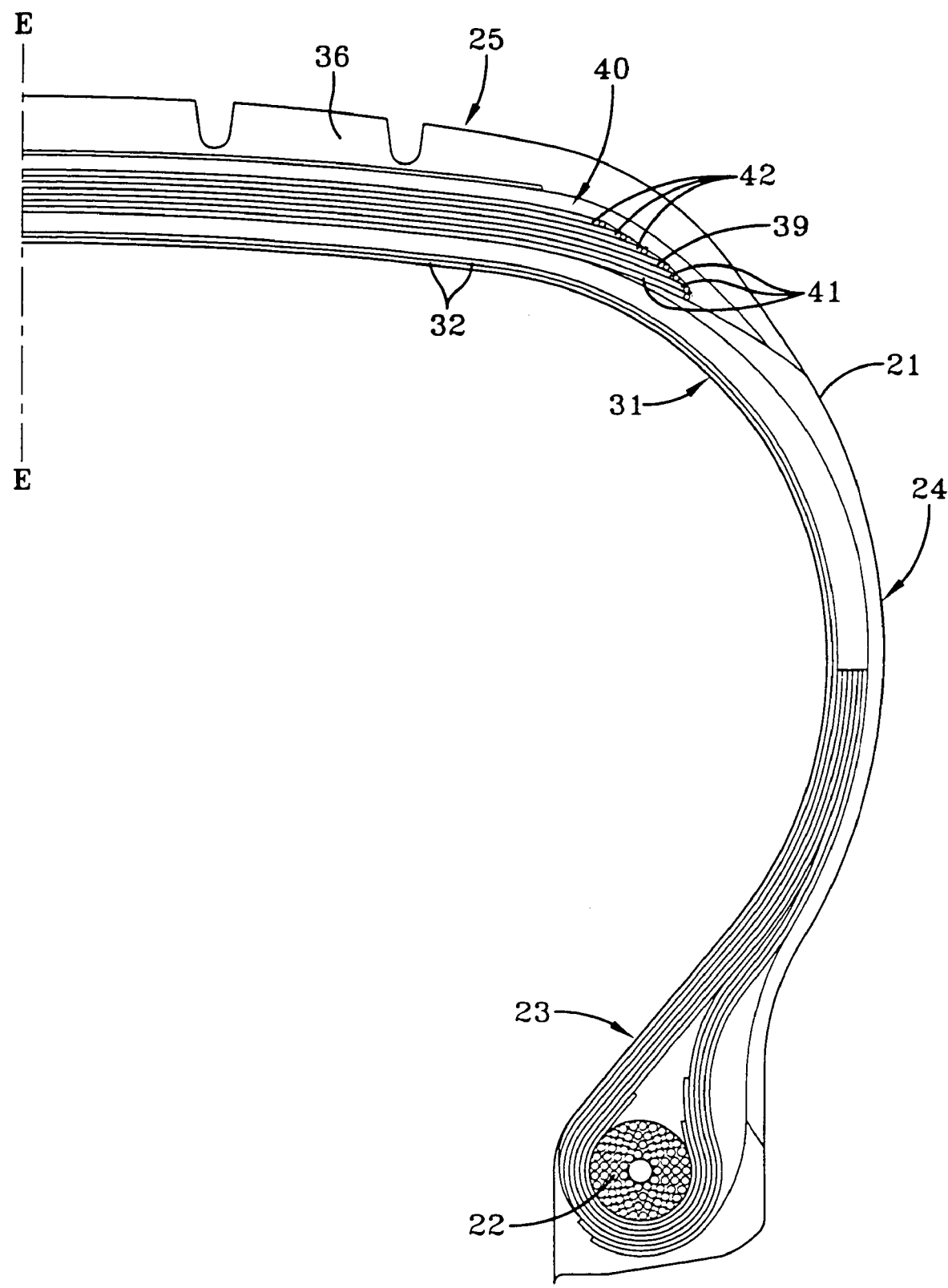
FIG. 1 us a schematically section view of a first embodiment of the tire according to the invention.
Figure 2:
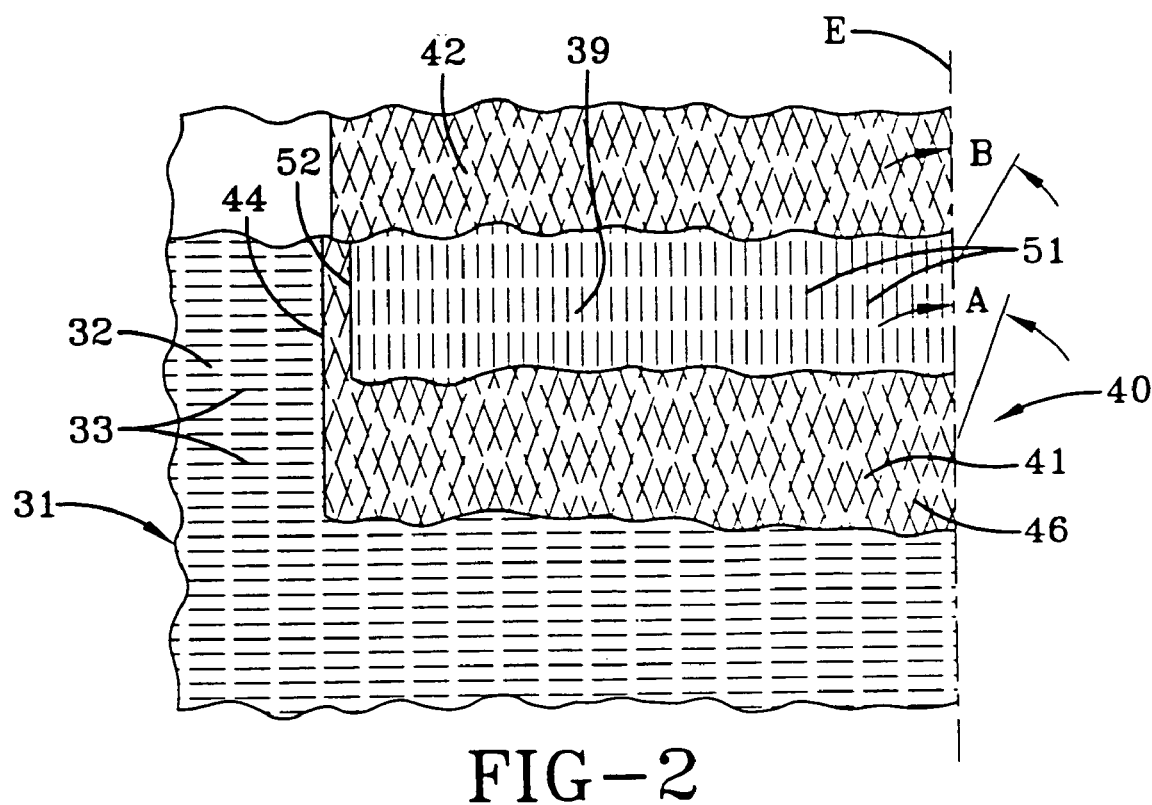
FIG. 2 is a partially cutaway top view of the tire shown in FIG. 1.

In FIGS. 1 and 2, numeral 21 is a radial tire of the preferred embodiment of the invention, as shown, to be mounted onto an airplane, which comprises a pair of bead portions 23 each containing a bead core 22 embedded therein, a sidewall portion 24 extending substantially outward from each of the bead portions 23 in the radial direction of the tire, and a tread portion 25 of substantially cylindrical shape extending between radially outer ends of these sidewall portions 24. Furthermore, the tire 21 is reinforced with a carcass 31 toroidially extending from one of the bead portions 23 to the other bead portion 23. The carcass 31 is comprised of at least two carcass plies 32, e.g. six carcass plies 32 in the illustrated embodiment. Among these carcass plies 32, four inner plies are wound around the bead core 22 from inside of the tire toward outside thereof to form turnup portions, while two outer plies are extended downward to the bead core 22 along the outside of the turnup portion of the inner carcass ply 32. Each of these carcass plies 32 contains many nylon cords 33 such as nylon-6,6 cords extending substantially perpendicular to an equatorial plane E of the tire (i.e. extending in the radial direction of the tire). A tread rubber 36 is arranged on the outside of the carcass 31 in the radial direction.

Figure 3:
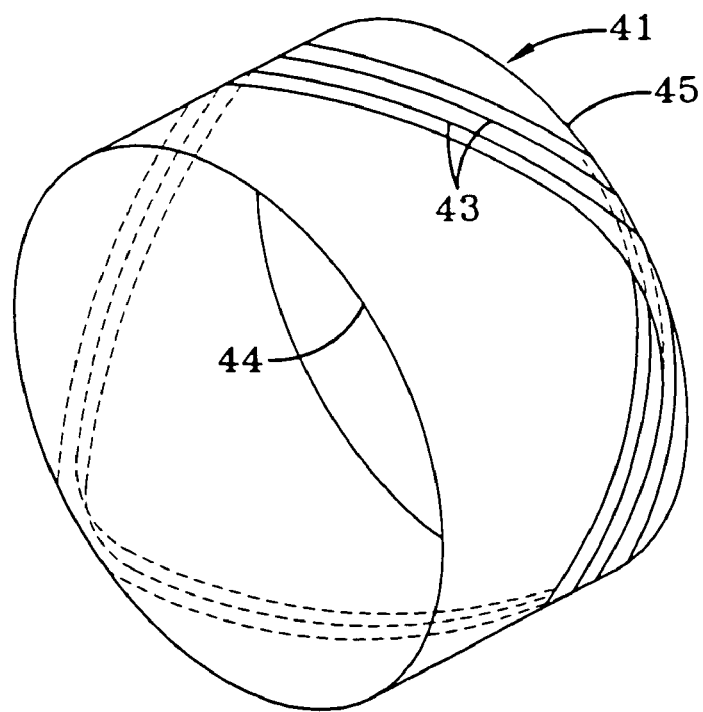
FIG. 3 is a schematically perspective view of an inner or outer zigzag belt layer in the middle of the formation.
Figure 4:
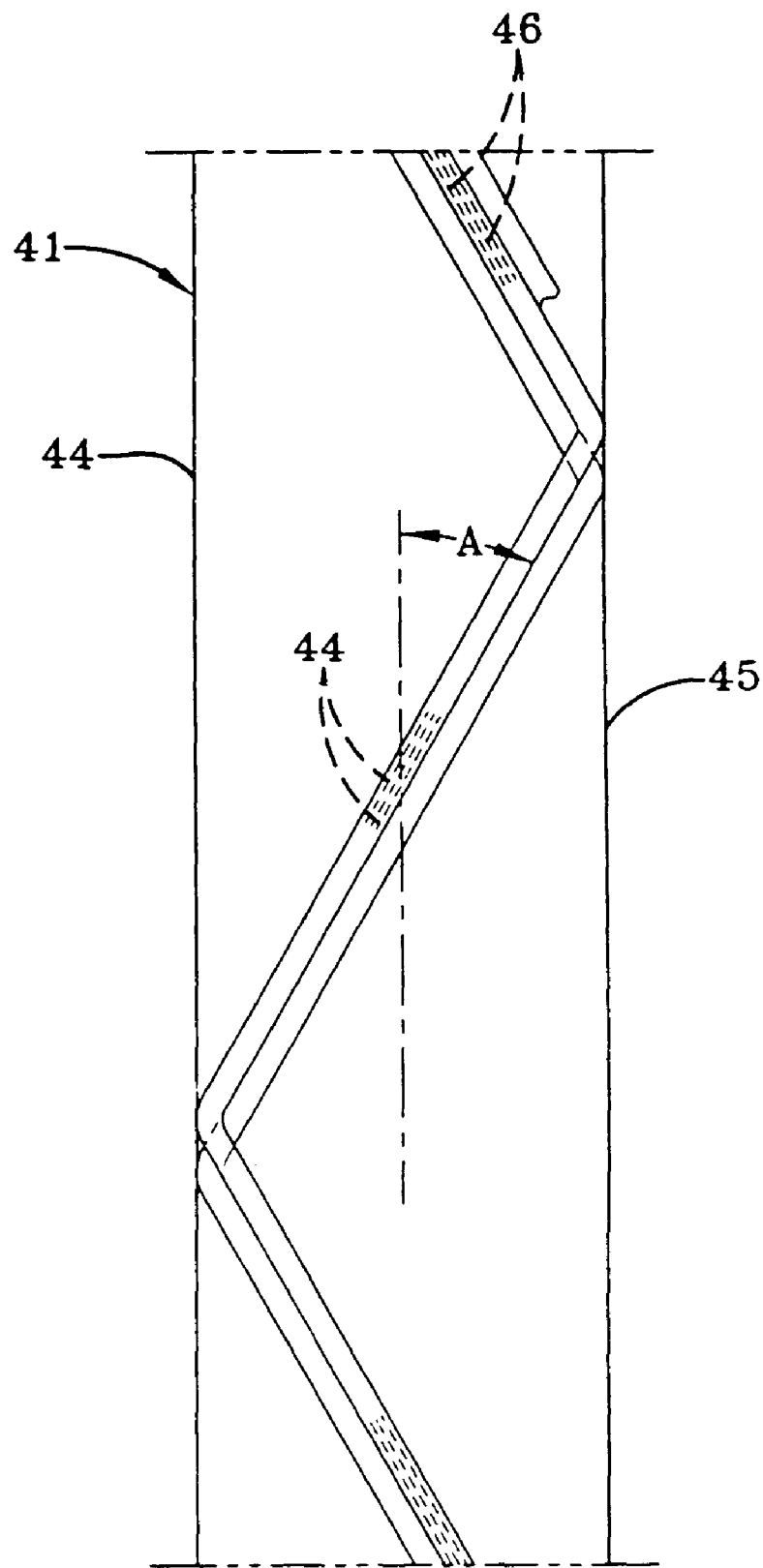
FIG. 4 is a schematically developed view of the inner or outer zigzag belt layers In the middle of the formation.
Figure 8:
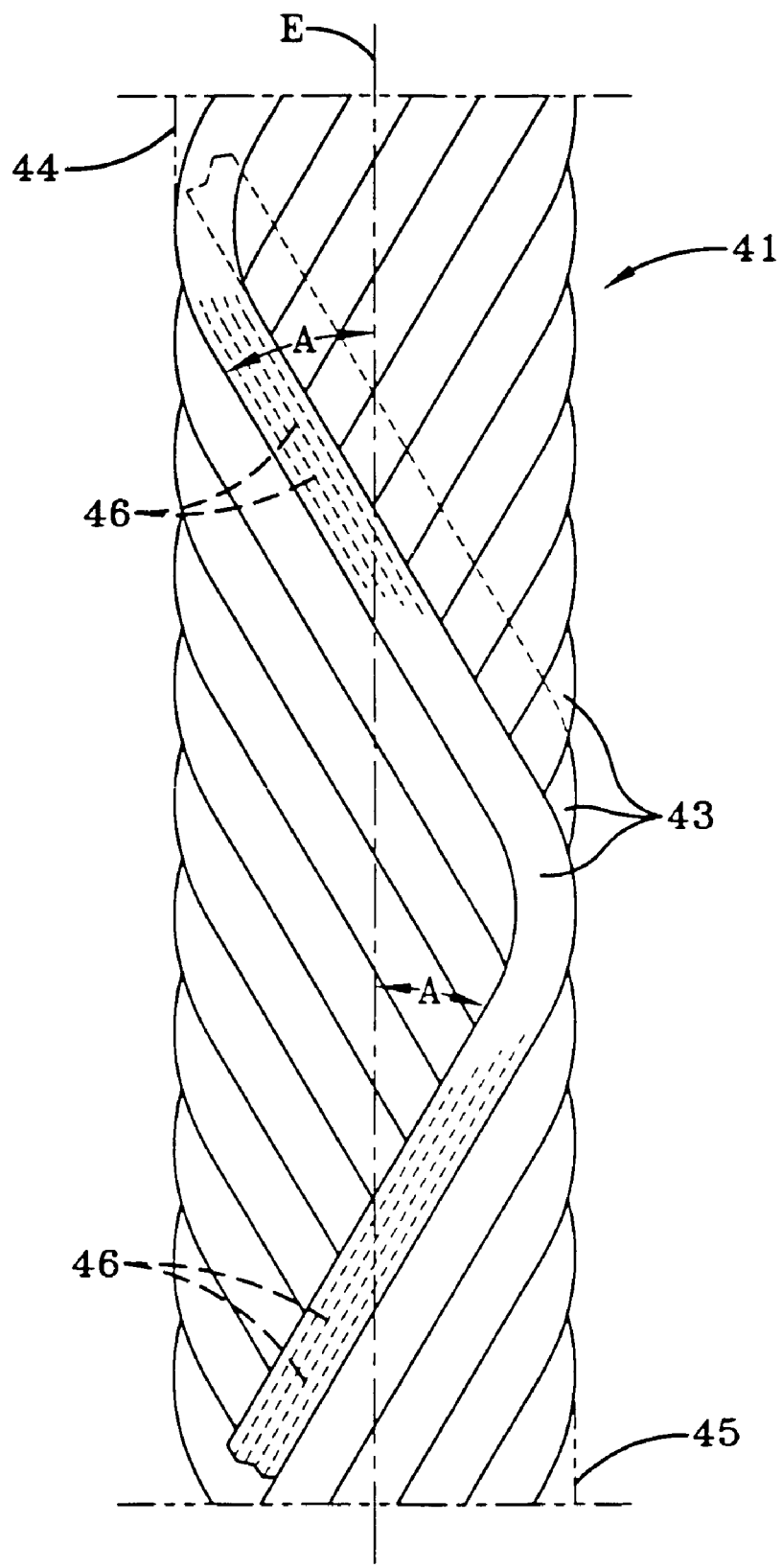
FIG. 8 is a schematically developed view of the inner layer located at an outmost side.

A belt 40 is arranged between the carcass 31 and the tread rubber 36 and is comprised of plural inner belt plies or layers 41 located near the carcass 31, i.e. two radially inner belt layers 41 in the illustrated embodiment and plural radially outer belt layers 42 located near to the tread rubber 36, i.e. two radially outer belt layers 42 in the illustrated embodiment. As shown in FIGS. 3 and 8, each of the radially inner belt plies 41 is formed by providing a rubberized strip 43 of one or more cords 46, winding the strip 43 generally in the circumferential direction while being inclined to extend between side ends or lateral edges 44 and 45 of the layer forming a zigzag path and conducting such a winding many times while the strip 43 is shifted at approximately a width of the strip in the circumferential direction so as not to form a gap between the adjoining strips 43. As a result, the cords 46 extend substantially zigzag in the circumferential direction while changing the bending direction at a turnaround point at both ends 44, 45 and are substantially uniformly embedded in the first inner belt layer 41 over a full region of the first inner belt layer 41. Moreover, it is intended to form the radially inner belt layer 41 by the above method, the cords 46 lie one upon another, so that two first and second inner belt layers 41 are formed while crossing the cords 46 of these plies with each other. Similarly the radially outer belt layers 42 are made using the same method. Interposed between the inner layers 41 and outer layers 42 is at least one spirally wound layer 39 of cords 46, the cords being wound at an angle of plus or minus 5 degrees or less relative to the circumferential direction.

Figure 9:
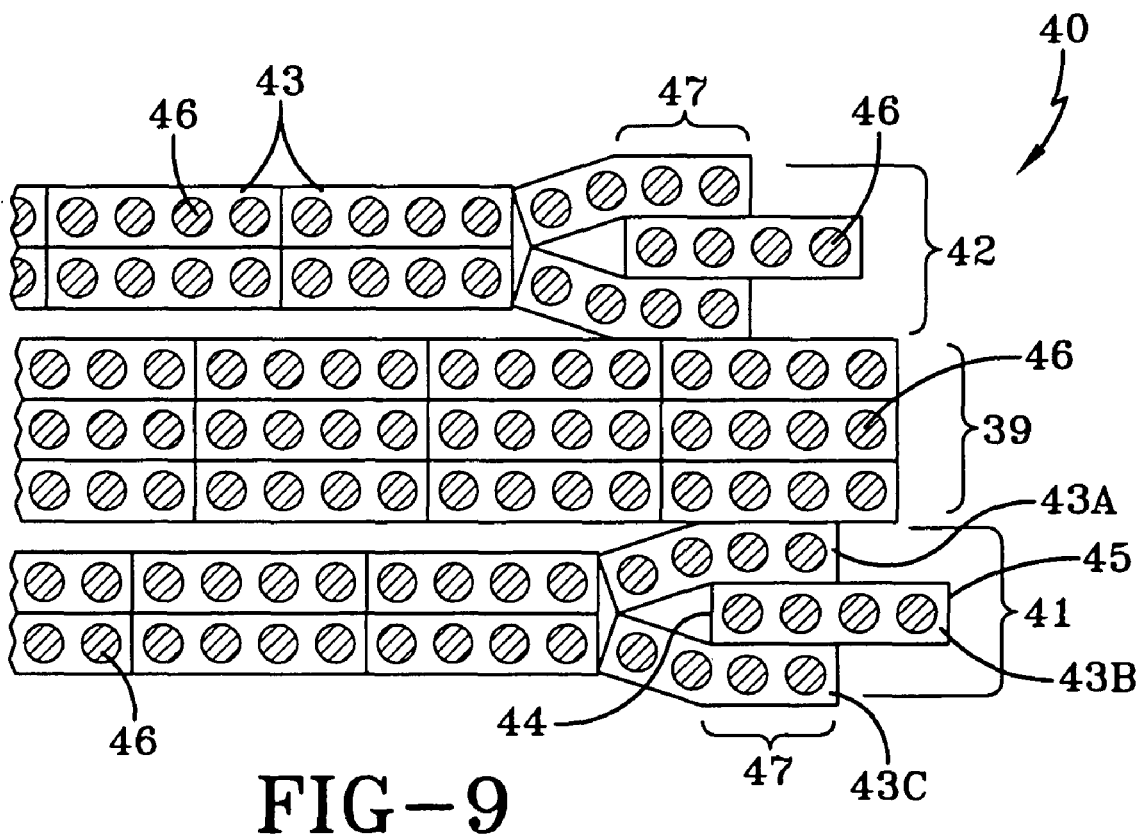
FIG. 9 is a schematically enlarged section view of another embodiment of plural inner belt plies in the vicinity of side end portions of these plies.

In the pneumatic radial tire for airplanes, there are various sizes, the tire illustrated is a 42×17.0R18 with a 26 ply rating and the tire 21 has the belt composite reinforcing structure as shown in FIG. 9. As shown the tire of FIG. 9 has two inner zigzag layers 41 and three spiral layers 39 and two outer zigzag layers 42. In any such tire size, the cords 46 of the inner belt plies 41 cross with each other at a cord angle A of 5 degrees to 15 degrees with respect to the equatorial plane of the tire when the strip 43 is reciprocated at least once between both side ends 44 and 45 of the ply within every 360 degrees of the circumference as mentioned above.

Figure 5:
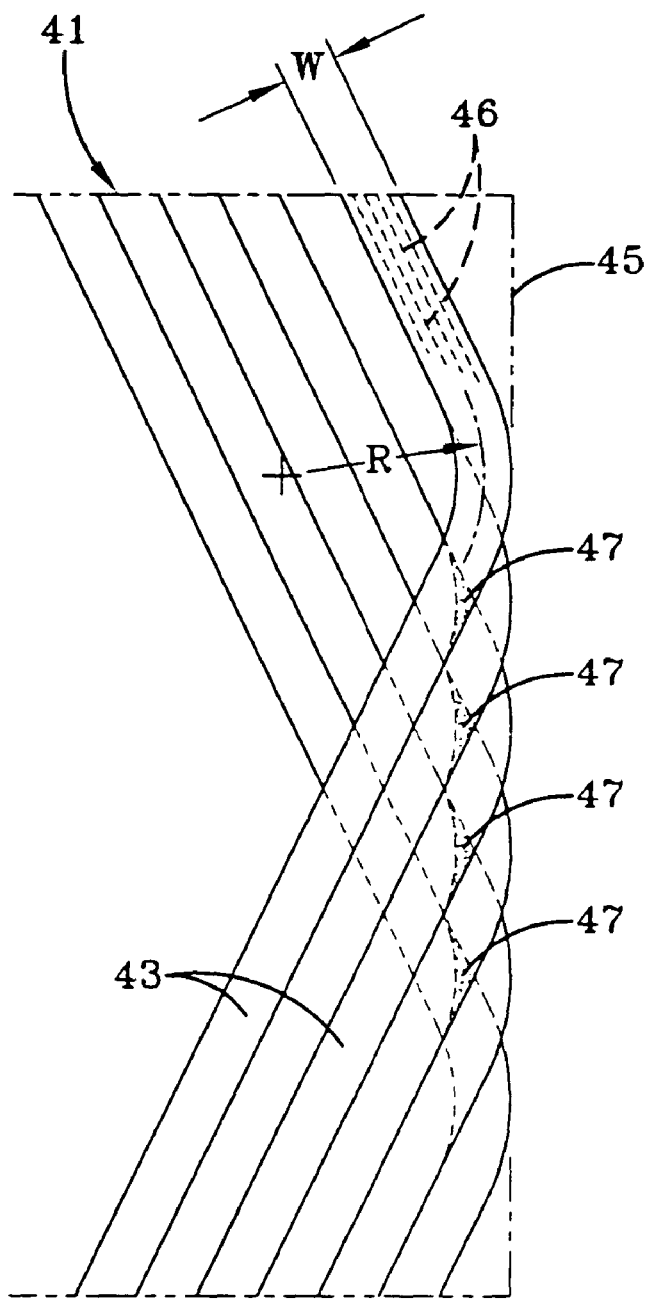
FIG. 5 is an enlargedly developed view of the inner or outer zigzag belt layers in the vicinity of the side end of the ply in the middle of the formation.
Figure 6:
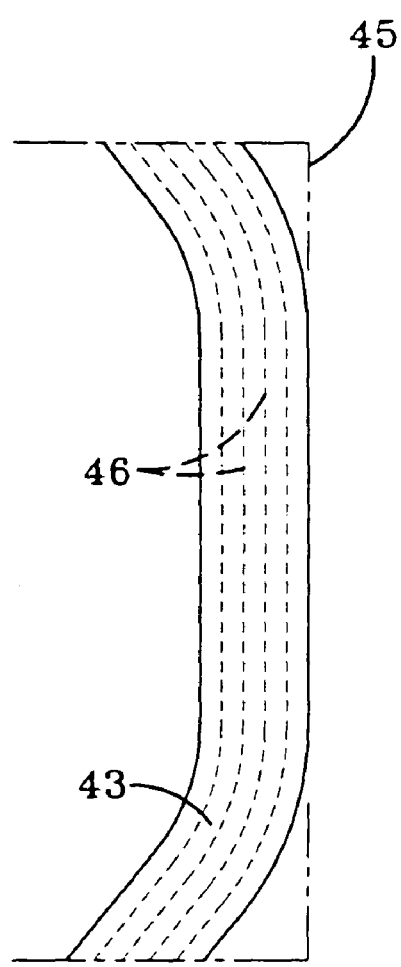
FIG. 6 is an enlargedly developed view of another embodiment of the inner belt layer in the vicinity of the side end of the ply in the middle of the formation.
Figure 7:
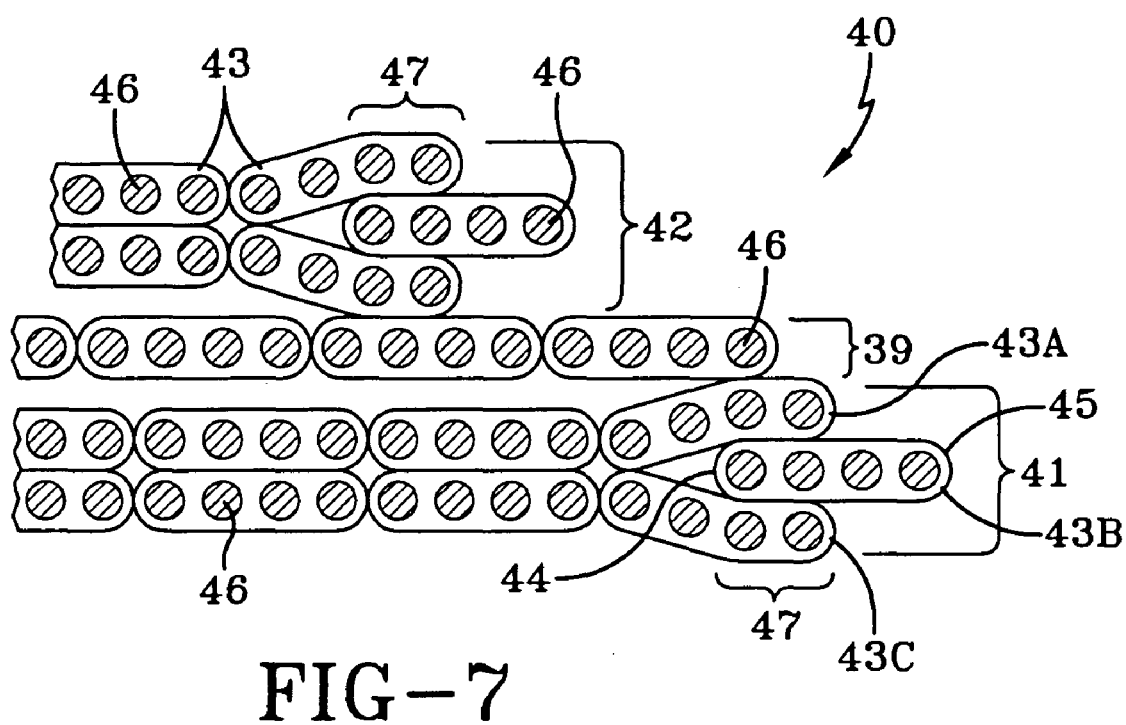
FIG. 7 is a schematically enlarged section view of the composite belt layers in the vicinity of side end portions of these plies.

In the illustrated embodiment, the widths of the inner belt layers 41 become narrower as the ply 41 is formed outward in the radial direction or approaches toward the tread rubber 36. Further, when the inner belt layers 41 is formed by winding the rubberized strip 43 containing plural cords 46 arranged in parallel with each other as mentioned above, a period for forming the ply layer 41 can be shortened and also the cord 46 arrangement can be made accurate. However, the strip 43 is bent at the side ends 44, 45 of the ply with a small radius of curvature R as shown in FIG. 5, so that a large compressive strain is produced in a cord 46 located at innermost side of the curvature R in the strip 43 to remain as a residual strain. When the cord 46 is nylon cord, if the compressive strain exceeds 25%, there is a fear of promoting the cord fatigue. However, when a ratio of R/W (R is a radius of curvature (mm) of the strip 43 at the side ends 44, 45 of the layer, and W is a width of the strip 43) is not less than 2.0 as shown in FIG. 6, the compressive strain produced in the cord 46 can be controlled to not exceed 25%. Therefore, when the inner belt layer 41 is formed by using the rubberized strip 43 containing plural nylon cords 46 therein, it is preferable that the value of R/W is not less than 2.0. In addition to the case where the strip 43 is bent at both side ends 44, 45 of the ply in form of an arc as shown in FIG. 5, the strip 43 may have a straight portion extending along the side end 44 (45) and an arc portion located at each end of the straight portion as shown in FIG. 6. Even in the latter case, it is favorable that the value of R/W in the arc portion is not less than 2.0. Furthermore, when the strip 43 is wound while being bent with a given radius of curvature R at both side ends 44, 45 of the ply, a zone 47 of a bent triangle formed by overlapping three strips 43 with each other at a half width of the strip as shown in FIG. 7 is repeatedly created in these bent portions or in the vicinity of both side ends 44, 45 of the ply in the circumferential direction as shown in FIG. 5. These two strips 43 are usually overlapped with each other by each forming operation. The width changes in accordance with the position in the circumferential direction continuously in the circumferential direction. Moreover, these laminated bent portions 47 turn inward in the axial direction as they are formed outward in the radial direction as shown in FIG. 7 because the widths of the inner belt layers 41 become narrower toward the outside in the radial direction as previously mentioned. In the bent portion 47, the outer end in widthwise direction of the middle strip 43c sandwiched between upper and lower strips 43a and 43b overlaps with the zone 47 located inward from the middle strip 43c in the radial direction as shown in FIG. 7. When the belt 40 is constructed with these inner belt layers 41, the total number of belt layers or plies can be decreased while maintaining total strength but reducing the weight and also the occurrence of standing wave during the running at high speed can be prevented.

The middle layers 39 of the composite belt structure 40 are spirally wound around the radially inner belt layers 41. As shown in FIG. 7 the spirally wound layer 39 extends completely across the two radially inner belt layers 41 and ends at 39a just inside the end 41a. The cords 46 within each strip 39 extend at an angle of 5 degrees or less relative to the circumferential equatorial plane. As shown four cords are in each strip. In practice the strips 41, 39, and 42 could be wound using a single cord 46 or plural cords 46 in a strip or ribbon having plural cords in the range of 2 to 20 cords within each strip. In the exemplary tire 21 of the size 42×17.0R18 strips 43 having 8 cords per strip 42 were used. The strips 43 had a width W, W being 0.5 inches. It is believed preferable that the strip width W should be 1.0 inch or less to facilitate bending to form the zigzag paths of the inner and outer layers 41, 42.

In the most preferred embodiment the layers 41, 39, and 42 are all formed from a continuous strip 43 that simply forms the at least two radially zigzag layers 41 and then continues to form the at least one spirally wound layer 39 and then continues on to form the at least two radially outer layers 42. Alternatively, the spirally wound layers 39 could be formed as a separate layer from a strip 43. This alternative method of construction permits the cords 46 to be of different size or even of different materials from the zigzag layers 41 and 42. What is believed to be the most important aspect of the invention is the circumferential layer 39 by being placed between the zigzag layers 41 and 42 greatly reduces the circumferential growth of the tire 21 in not only the belt edges 44, 45 but in particular the crown area of the tread 36. The spirally wound circumferential layer 39, by resisting growth in the crown area of the tire, greatly reduces the cut propensity due to foreign object damage and also reduces tread cracking under the grooves. This means the tire's high speed durability is greatly enhanced and its load carrying capacity is even greater. Aircraft tires using multiple layers of only zigzag ribbons on radial plied carcasses showed excellent lateral cornering forces. This is a common problem of radial tires using spiral layers in combination with cut belt layers which show poor cornering or lateral force characteristics. Unfortunately, using all zigzag layered belt layers have poor load and durability issues that are inferior to the more conventional spiral belt layers in combination with cut belt layers.

Figure 10:
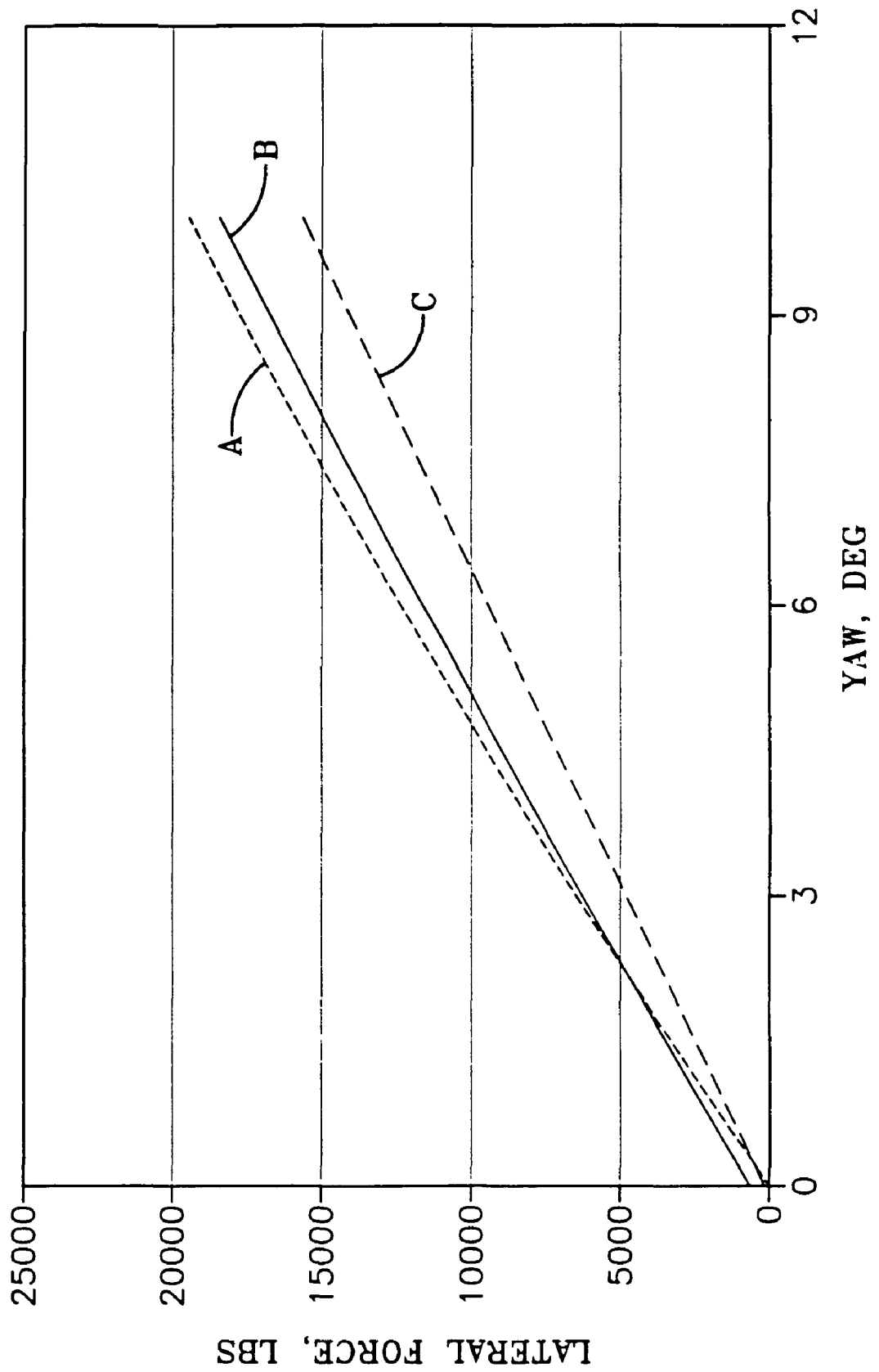
FIG. 10 is a lateral force graph for tire B according to the invention and for two comparative tires A and C.

The present invention has greatly improved the durability of the zigzag type belt construction while achieving very good lateral force characteristics as illustrated in FIG. 10. The all zigzag belted tire A is slightly better than the tire B of the present invention which is shown better than the spiral belt with a combination of cut belt layers of tire C in terms of lateral forces. Nevertheless the all zigzag belted tire A cannot carry the required double overloads at inflation whereas the tire B of the present invention easily meets these load requirements.

The tire of the present invention may have a nylon overlay 50 directly below the tread. This overlay 50 is used to assist in retreading.

What is claimed is:

1. A pneumatic tire comprising:
a carcass and a belt reinforcing structure having at least two zigzag belt reinforcing structures, each zig zag belt reinforcing structure comprised of two layers of cords inclined at 5 to 30 degrees relative to the centerplane of the tire extending in alternation to turnaround points at each lateral edge, and
a plurality of spirally wound belt layers having cords wound spirally at an inclination of 5 degrees or less relative to the tire's centerplane, wherein the plurality of spirally wound belt layers have substantially the same width and are located between the at least two zigzag belt reinforcing structures, and the width of the spirally wound belt layers is wider than the radially outer zigzag belt reinforcing structure and narrower than the radially inner zigzag belt structure.

* * * * *

UNITED STATES PATENT AND TRADEMARK OFFICE
CERTIFICATE OF CORRECTION

PATENT NO. : 7,789,120 B2
APPLICATION NO. : 11/103110
DATED : September 7, 2010
INVENTOR(S) : Ueyoko et al.

It is certified that error appears in the above-identified patent and that said Letters Patent is hereby corrected as shown below:

On the Title Page, column 1, line 75, correct the spelling of the last name of the third inventor from Roel Domingo Villaneuva, to --Roel Domingo Villanueva--

Signed and Sealed this

Fourteenth Day of December, 2010

David J. Kappos
*Director of the United States Patent and Trademark Office*